UNITED STATES PATENT OFFICE.

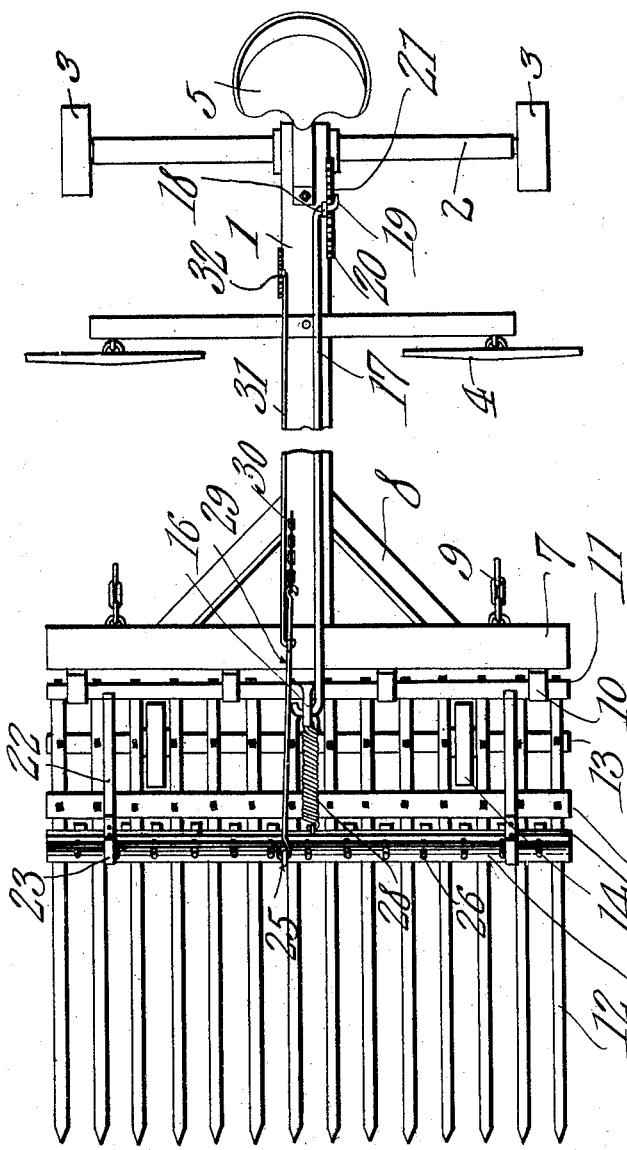

CHARLES D. RICKETTS, OF VERNON, KANSAS.

MANURE-LOADER.

983,401.   Specification of Letters Patent.   Patented Feb. 7, 1911.

Application filed March 4, 1910. Serial No. 547,274.

*To all whom it may concern:*

Be it known that I, CHARLES D. RICKETTS, a citizen of the United States, residing at Vernon, in the county of Woodson and State of Kansas, have invented a new and useful Manure-Loader, of which the following is a specification.

This invention relates to a manure loader and it consists in the novel construction and arrangement of its parts hereinafter shown and described.

The object of the invention is to provide a simple and an effective loading apparatus including a wheel-mounted rake having a series of pivoted tines with means for swinging the same, the rake being adapted to be used as a push implement for impaling the manure thereon. A swinging ejecting means is mounted upon the rake and when operated is adapted to sweep the material from the tines thereof.

In the accompanying drawings,—Figure 1 is a top plan view of the rake of the apparatus. Fig. 2 is a side elevation of the same.

The rake consists of a beam 1 which is mounted at its rear end upon an axle 2 which in turn is supported upon the ground wheels 3. Swingletrees 4 are attached in the usual manner to the beam 1 and an operator's seat 5 is mounted upon the beam 1. The forward portion of the beam 1 is notched out as at 6 and receives the intermediate lower edge portion of a cross beam 7. The beam 7 is braced in its position at the forward end of the beam 1 by braces 8 which are connected at their ends with said beam. Breast chains 9 are connected with the end portions of the cross beam 7 and are adapted to be attached to the collars of draft animals which in turn are hitched to the swingletree 4. Bearings 10 are mounted upon the forward side of the cross beam 7 and a shaft 11 is journaled for rotation in the said bearings 10. The rear ends of tines 12 are secured to the shaft 11 and an axle shaft 13 is located under the rear portion of the tines 12 and is secured to the same and is parallel with the shaft 11. Supporting wheels 14 are journaled upon the intermediate portion of the axle shaft 13 and lie between adjacent tines 12. A cross bar 15 is fixed to the upper side of the tines 12 in the vicinity of the axle shaft 13 and thus means is provided for supporting the said tines upon the cross beam 7.

An upstanding standard 16 is mounted upon the intermediate portion of the shaft 11 and is rigid with the said shaft. A link 17 is pivotally connected at its forward end with the standard 16 and at its rear end is connected with an operating lever 18 which in turn is pivoted upon the beam 1. The rear end portion of the link 17 is crooked as at 19 and is adapted to enter notches 20 provided in the periphery of a segment 21 also mounted upon the beam 1. Thus it will be seen that as the lever 18 is swung and the link 17 is moved longitudinally the shaft 11 is swung upon its axis, and thus means are provided for raising or lowering the forward end of the tines 12.

Brackets 22 are mounted upon the cross bar 15 and shaft 11 and the said brackets are provided at their upper ends with bearings 23. A shaft 24 is journaled in the bearings 23 and at an intermediate point is provided with an upstanding arm 25. Fingers 26 are attached at their upper ends to the shaft 24 and pass through a cross bar 27 and the lower portions of the said fingers lie in the spaces between the tines 12. A traction spring 28 is connected at one end with the standard 16 and at its other end with the cross bar 27. The said spring is under tension with a tendency to hold the lower ends of the fingers toward the cross bar 15. A link 29 is pivotally connected at one end with the upper end of the arm 25, and at its rear end is connected with a bridle chain 30 which in turn is secured at its rear end to the beam 1. A link 31 is connected at its forward end with the rear end portion of the link 29 and the rear end of the link 31 is connected with a lever 32 which in turn is pivoted upon the beam 1. Thus it will be seen that by swinging the lever 32 the link 31 will be moved longitudinally whereby the link 29 will be similarly moved and the arm 25 will be swung about the axis of the shaft 24 which as it turns will swing the fingers 26 along the tine 12 and thus the material which has been accumulated thereon (as will be explained presently) is pushed or swept from the said tine 12. The bridle chain 30 is of such length as to prevent the lower end portions of the fingers 26 from striking the cross bar 15 under the tension of the spring 28 when the said fingers return to their normal position.

In operation, the rake is passed over the ground with the pointed ends of the tines 12 toward the muck. As the tines approach the muck the lever 18 is swung so that the pointed ends of the tines are lowered and they are projected into the muck. The forward movement of the rake is then interrupted and the lever 18 is swung so that the pointed ends of the tines 12 are elevated above the surface of the ground. Thus the material is lifted and the rake may be backed and then moved to any desired point. The lever 18 is then swung so that the tines 12 are approximately in a horizontal position. The lever 32 is then swung so that the fingers 26 will pass along the tines 12 and brush or force the material from the ends of the tines.

Having described the invention what I claim as new and desire to secure by Letters Patent is:—

1. A rake comprising a wheel mounted beam, a shaft journaled at the forward end of the beam, tines fixed to said shaft, a standard fixed to the shaft, means mounted upon the beam for swinging the standard, brackets mounted upon the tines, a shaft journaled in the brackets, fingers carried by the last said shaft and normally lying between the tines, means mounted upon the beam for swinging the last said shaft, and a return spring connected at one end with the fingers and at its other end with said standard.

2. A rake comprising a wheel-mounted beam, a shaft journaled for rotation at the forward end of the beam, tines fixed at their rear ends to the said shaft, an axle shaft located under the rear portions of the tines, wheels journaled upon said axle shaft, a cross bar connected to the upper sides of the rear portions of the tines, brackets mounted upon the first said shaft and said cross bar, a shaft journaled at the upper ends of the brackets, fingers carried by the last mentioned shaft and normally lying between the tines, a cross bar attached to the fingers between the ends thereof, a standard mounted upon the first said shaft, means mounted upon the beam for swinging said standards, a traction spring connected at one end with the standard and at the other end with the cross bar attached to the fingers, and means mounted upon the beam for swinging the finger shaft against the tension of said spring.

In testimony that I claim the foregoing as my own, I have hereto affixed my signature in the presence of two witnesses.

CHARLES D. RICKETTS.

Witnesses:
WILLIAM TODD,
J. M. RICKETTS.